May 29, 1962  F. GEIGER  3,036,860
IMPROVED SLIDING ROOF PORTIONS FOR MOTOR VEHICLES
Filed July 31, 1959
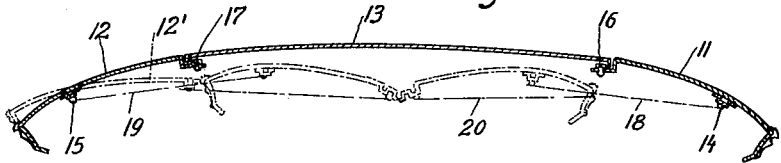
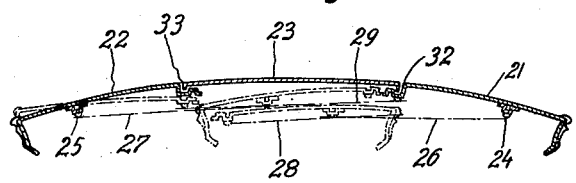
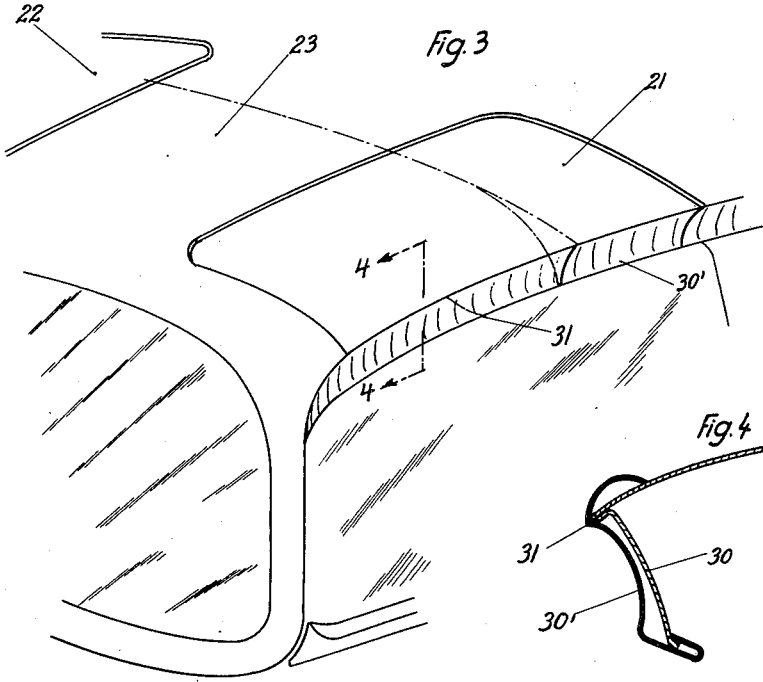
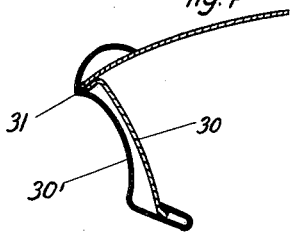
Inventor
FRIEDRICH GEIGER
BY
Dickey, Craig and Freudenberg
Attorneys United States Patent Office 3,036,860
Patented May 29, 1962

3,036,860
IMPROVED SLIDING ROOF PORTIONS FOR MOTOR VEHICLES
Friedrich Geiger, Boblingen, Germany, assignor to Daimler-Benz Aktiengesellschaft, Stuttgart-Unterturkheim, Germany
Filed July 31, 1959, Ser. No. 830,852
Claims priority, application Germany Aug. 1, 1958
10 Claims. (Cl. 296—137)

My invention relates to a motor vehicle body and more particularly to a body of the type in which the roof is provided with lateral spaced apertures contiguous with the door openings provided in the side walls and adapted to be closed by panels capable of being moved to a position in which the roof apertures are open. The lateral apertures of the roof are provided for the convenience of the passengers as they greatly facilitate the boarding of the car and the alighting therefrom owing to the elimination of the marginal portions of the roof which would interfere with the passenger's head and shoulder, when the passenger attempts to climb into or to get out of the car in erect attitude. Therefore, when the roof apertures are open, no particular physical effort is required for getting into or out of the car even if the roof is provided at a very low level.

It is the primary object of my invention to so mount the movable panels that, after the doors have been closed, the panels may be moved to or kept in the position in which they uncover the roof aperture for the purpose of an improved ventilation of the passenger compartment under fair weather conditions. More particularly it is an object of my invention to so mount the movable roof panels that one roof aperture may be closed by the associated panel whereas the other aperture is kept open, as may be desirable for protection against excessive sunshine.

Finally it is an object of my invention to so construct the roof provided with apertures for increasing the entry space afforded by the door openings and with panels for optionally closing such apertures that during travel the central section of the roof provided between the apertures will prevent the flow of air extending across the full width of the roof from detaching itself therefrom so that the central portion of the flow of air remains unaffected by the apertures. As a result the air resistance will be minimized.

Further objects of my invention will appear from a detailed description of a preferred embodiment thereof following hereinafter with reference to the drawings. It is to be understood, however, that my invention is in no way limited to such details and that the terms and phrases used in such detailed description have been chosen for the purpose of explaining rather than that of restricting or limiting my invention.

In the accompanying drawings

FIG. 1 is a vertical cross-section taken through the roof of a motor vehicle and through the door openings provided in opposite side walls, the central section of the roof between the apertures being wider than the panels provided for closing such apertures, FIG. 2 is a cross-section through a modified roof of a motor vehicle, the section being likewise taken within a vertical plane extending through the door openings provided in opposite side walls, the central section of the roof between the lateral apertures having the same width as the panels, FIG. 3 is a perspective view of the roof illustrated in FIG. 2, and FIG. 4 is a partial section taken in a vertical plane indicated by the line IV—IV of FIG. 3.

The motor vehicle body has side walls provided with door openings and a roof provided with lateral substantially rectangular recesses forming apertures contiguous with the door openings for the purpose of widening the entry space for the passenger afforded thereby. The apertures are provided in the roof in spaced relationship on either side of a central roof section 13. Each lateral aperture may be closed by a panel, such as panel 11, or 12 respectively, shown in FIG. 1. The panels 11 and 12 are movably mounted whereas the intermediate section 13 forms an integral portion of the roof. In the embodiment illustrated in FIG. 1 this central section 13 is twice as wide as each of the two panels 11 and 12.

Suitable means are provided for mounting each of the panels 11 and 12 for a movement between the position in which the panel closes one of the apertures and a position in which it uncovers the apertures.

Preferably such mounting means include guiding means for guiding each of the panels for movement transversely of the vehicle body. For this purpose, I prefer to provide each panel with a pair of trunnions 14, or 15 respectively which are fixed to each panel between its outer and its inner edge and have a common pivotal axis extending lengthwise of the vehicle. A first pair of guide rails diagrammatically indicated in FIG. 1 by a dash-dotted line 18 is mounted for panel 11 below the roof and suitably secured thereto so as to extend substantially below the front edge and the rear edge of the right hand roof aperture. These rails 18 may be channel bars in which the trunnions 14 are slidably guided. Similarly, a first pair of guide rails 19 is associated with the left hand aperture in a similar manner for the accommodation of the trunnions 15 of panel 12. A second pair of guide rails is provided for the inner corners 16 or 17 of each panel. In the embodiment illustrated in FIG. 1 in which the central section 13 is twice as wide as each of the panels 11 and 12 the rails of the second pair for panel 11 are integral with the rails of the second pair for the other panel 12, one set of the integral rails being indicated by the dash-dotted line 20. These rails likewise extend in vertical transverse planes of the vehicle and are suitably secured to the roof. When the driver wishes to open the roof aperture closed by the panel 12 for instance, he proceeds as follows:

First he pivots the roof panel 12 about the axis of its trunnions 15 to the position indicated in FIG. 1 by dash-dotted lines at 12'. In this position the inner corners 17 of the panel 12 slidably engage the guide rails 20. Then the driver pushes the panel 12 inwardly causing the trunnions 15 to slide in the guide rails 19 and the inner corners 17 to slide on the guide rails 20 until the panel is located below the central roof section 30 throughout its width. When both roof apertures are fully opened, the panels 11 and 12 will be positioned at substantially the same level one beside the other.

In the embodiment illustrated in FIG. 2 the central roof section 23 has the same width as each of the panels 21 and 22. In this embodiment also each panel 21, or 22 respectively, has a pair of trunnions 24, or 25 respectively, slidably guided in a pair of guide rails 26, or 27 respectively. These guide rails 26 and 27, however, have their inner ends disposed at different levels one above the other. Similarly, a pair of guide rails 28 is provided for the inner corners of panel 21 and a pair of guide rails 29 is provided for the inner corners of panel 22. These guide rails 28 and 29 are disposed at different levels one below the other. When the driver wishes to open a roof aperture, he will first pivot the respective panel, such as 21, about the axis of its trunnions 24 until the inner corners 32 of the panel 21 will engage the guide rails 28. Then the panel 21 will be pushed inwardly. The other panel 22 may be operated in a similar manner, its outer corners 33 slidably engaging the pair of guide rods 29. When both apertures are opened, the panels 21 and 22 will be positioned one above the other below the central roof section 23.

As illustrated in FIGS. 3 and 4, the roof is substantially flat being but slightly curved in a convex manner. A peripheral portion 30 of the roof, however, is inclined inwardly and downwardly at a small angle to the vertical. Preferably, an ornamental strip 30' is fixed to the peripheral portion 30 and the roof. This strip has a downwardly facing drip edge 31 registering with the roof portion of slightly convex curvature. The slight curvature of the roof has the advantage of increasing the internal height of the passenger compartment near the side walls. The steep disposition of the peripheral roof portion 30 affords unobstructed view to the passengers in upward direction when the panels are in their retracted positions.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a motor vehicle the combination comprising side walls provided with door openings, a roof provided with lateral spaced apertures contiguous with said door openings, a pair of substantially rigid panels in a first position thereof forming a substantially flush surface with the remainder of the roof, a pair of trunnions fixed to each panel between its outer and its inner edge and having a common pivotal axis extending lengthwise of the vehicle, and guide means for guiding each of said panels for movement between said first position in which it closes one of said apertures and a second position in which it uncovers the same and is located below a central section of said roof between said apertures, said guide means including a first pair of guide rails for each pair of trunnions and a second pair of guide rails for the inner corners of each panel, said rails being fixed to said roof and extending transversely of the longitudinal axis of the vehicle.

2. The combination claimed in claim 1 in which said central section of said roof located between said lateral spaced apertures has a width twice that of each of said panels, the rails of said second pair for one panel being integral with the rails of said second pair for the other panel.

3. The combination claimed in claim 1 in which said roof comprises a central portion of slightly convex curvature and a peripheral portion inclined at a small angle to the vertical, said combination further comprising an ornamental strip fixed to said peripheral portion and having a downwardly facing drip edge registering with said portion of slightly convex curvature.

4. The combination claimed in claim 1 in which said first and second pair of guide rails associated with each panel lie in intersecting planes.

5. The combination claimed in claim 1 in which said second pair of guide rails for one of the panels is vertically spaced above said second pair of guide rails for the other panel.

6. The combination claimed in claim 1 in which the guide means are operated manually independently of actuating means for the doors of the vehicle.

7. The combination claimed in claim 1 in which the inner corners of each panel are pivoted downwardly about a pivot axis prior to movement along the transversely extending guard rails.

8. In a motor vehicle, a roof structure comprising a fixed roof portion provided with spaced lateral apertures contiguous to door openings of said motor vehicle, substantially rigid roof panels manually movable to close said apertures in a first position thereof to form a substantially flush surface with said fixed roof portion, slide members secured to each panel intermediate the outer and inner edges of each panel, means forming a common pivot axis extending in the longitudinal direction of said vehicle for said slide members of each panel, guide means for guiding each of said panels for movement between said first position to a second position in which said apertures are uncovered and in which said panels are located below a central section of said fixed roof portion, said guide means including first guide rail means for each panel adapted to operatively engage said sliding members and second guide rail means for each panel adapted to operatively engage said inner edges, said first and said second guide rail means extending transversely of said vehicle, and at least some of said guide rail means lying in intersecting positions.

9. The combination claimed in claim 8, in which each of said first and second guide rail means include a pair of spaced guide rails, and in which the first guide rail means and the second guide rail means of each panel lie in intersecting planes.

10. The combination claimed in claim 9, in which said pair of spaced guide rails forming said second guide rail means for one of said panels is vertically spaced above said pair of spaced guide rails forming said second guide rail means for the other panel whereby in said second position said one panel is vertically spaced above said other panel.

References Cited in the file of this patent

UNITED STATES PATENTS

| 2,338,309 | Votypka | Jan. 4, 1944 |
| 2,434,711 | Mobbs et al. | Jan. 20, 1948 |
| 2,556,062 | Buehrig | June 5, 1951 |
| 2,686,076 | Helser | Aug. 10, 1954 |

FOREIGN PATENTS

| 392,923 | Great Britain | May 25, 1933 |
| 556,483 | Great Britain | Oct. 6, 1943 |